United States Patent
Fritz et al.

(10) Patent No.: US 11,420,533 B2
(45) Date of Patent: Aug. 23, 2022

(54) BATTERY SYSTEM

(71) Applicant: SAMSUNG SDI CO., LTD., Yongin-si (KR)

(72) Inventors: Jürgen Fritz, Graz (AT); Peter Kurcik, Sausal (AT)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/208,279

(22) Filed: Mar. 22, 2021

(65) Prior Publication Data

US 2021/0300208 A1     Sep. 30, 2021

(30) Foreign Application Priority Data

Mar. 30, 2020  (EP) ..................................... 20166699
Mar. 16, 2021  (KR) ......................... 10-2021-0034175

(51) Int. Cl.
*B60L 50/60*     (2019.01)
*B60L 58/18*     (2019.01)
*H02M 3/335*   (2006.01)

(52) U.S. Cl.
CPC ............... *B60L 58/18* (2019.02); *B60L 50/66* (2019.02); *H02M 3/335* (2013.01); *B60L 2210/10* (2013.01)

(58) Field of Classification Search
USPC ................................................. 307/10.1, 9.1
See application file for complete search history.

(56) References Cited

U.S. PATENT DOCUMENTS

| | | | | |
|---|---|---|---|---|
| 5,583,751 | A | * 12/1996 | Nakazawa | .............. B60L 50/66 363/20 |
| 5,796,175 | A | * 8/1998 | Itoh | .......................... H02J 9/06 307/10.1 |
| 2004/0147972 | A1 | 7/2004 | Greatbatch et al. | |
| 2005/0068003 | A1 | 3/2005 | Gauthier et al. | |
| 2006/0022642 | A1 | * 2/2006 | McGee | ............... H02J 7/00302 320/132 |

(Continued)

FOREIGN PATENT DOCUMENTS

EP   0644079 A2   3/1995
FR   2994896 A1   3/2014

OTHER PUBLICATIONS

Extended European Search Report dated Jul. 16, 2020 for EP 20166699.7.
European Office action dated May 18, 2022.

*Primary Examiner* — Rexford N Barnie
*Assistant Examiner* — Xuan Ly
(74) *Attorney, Agent, or Firm* — Lee IP Law, P.C.

(57) ABSTRACT

A battery system for an electric vehicle, including: a high voltage (HV) battery subsystem including a battery cell stack with battery cells electrically connected between stack nodes; a low voltage (LV) battery subsystem including a LV battery and a supply node connectFed to the LV battery; a DC/DC converter with a primary coil in the HV battery subsystem and a secondary coil in the LV battery subsystem, wherein the primary coil is connected to one of the stack nodes via a switch. A threshold signal indicative of a voltage at the supply node may be generated in the LV battery subsystem and may be transmitted to the HV battery system. A state of the switch may be controlled based on the threshold signal.

14 Claims, 3 Drawing Sheets

(56) References Cited

U.S. PATENT DOCUMENTS

| | | | |
|---|---|---|---|
| 2007/0216452 A1 | 9/2007 | Matsumoto et al. | |
| 2009/0034308 A1* | 2/2009 | Welch | B60L 58/20 |
| | | | 363/133 |
| 2010/0277132 A1 | 11/2010 | Hara et al. | |
| 2012/0223575 A1 | 9/2012 | Hachiya et al. | |
| 2018/0141457 A1* | 5/2018 | Lee | B60L 58/20 |

* cited by examiner

BATTERY SYSTEM

CROSS-REFERENCE TO RELATED APPLICATION

European Patent Application No. 20166699.7, filed on Mar. 30, 2020, in the European Intellectual Property Office, and entitled: "Battery System," and Korean Patent Application No. 10-2021-0034175, filed on Mar. 16, 2021, in the Korean Intellectual Property Office, and entitled: "Battery System," are incorporated by reference herein in their entirety.

BACKGROUND

1. Field

Embodiments relate to a battery system as well as to a vehicle with such a battery system.

2. Description of the Related Art

A rechargeable or secondary battery differs from a primary battery in that it may be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g., cylindrical or rectangular, depends on the battery's intended purpose.

Rechargeable batteries may be used as a battery module formed of a plurality of unit battery cells coupled in series and/or in parallel so as to provide a high energy density. That is, the battery module is formed by interconnecting the electrode terminals of the plurality of battery cells depending on a required amount of power and in order to realize a high-power rechargeable battery. In general, one or more battery modules are mechanically and electrically integrated, equipped with a thermal management system and set up for communication with one or more electrical consumers in order to form a battery system.

For meeting the dynamic power demands of various electrical consumers connected to the battery system a static control of battery power output and charging may be replaced by a steady or intermittent exchange of information between the battery system and the controllers of the electrical consumers. This information includes the battery systems actual state of charge (SoC), potential electrical performance, charging ability and internal resistance as well as actual or predicted power demands or surpluses of the consumers.

For monitoring, controlling, and/or setting of the aforementioned information, a battery system usually includes a battery management system, BMS. Such a control unit may be integral with the battery system, or may be part of a remote controller communicating with the battery system via a suitable communication bus. In both cases, the control unit communicates with the electrical consumers via a suitable communication bus, e.g., a CAN or SPI interface.

SUMMARY

Embodiments are directed to a battery system for an electric vehicle, including: a high voltage (HV) battery subsystem including a battery cell stack with battery cells electrically connected between stack nodes; a low voltage (LV) battery subsystem including a LV battery and a supply node connected to the LV battery; a DC/DC converter with a primary coil in the HV battery subsystem and a secondary coil in the LV battery subsystem, wherein the primary coil is connected to one of the stack nodes via a switch. A threshold signal indicative of a voltage at the supply node may be generated in the LV battery subsystem and may be transmitted to the HV battery system. A state of the switch may be controlled based on the threshold signal.

The LV battery subsystem may include a comparator with a first input node connected to the supply node and a second input node connected to a predetermined reference voltage. The threshold signal may be output by the comparator.

The threshold signal may be transmitted via an optocoupler from the LV battery subsystem to the HV battery subsystem.

The switch may be set switching if the threshold signal is indicative of a voltage below a threshold voltage. The switch may be set non-conductive if the threshold signal is indicative of a voltage above the threshold voltage.

When the switch is set switching, a stack voltage may be provided to the primary coil, and a stepped-down voltage may be provided to the supply node by the secondary coil.

The stack voltage may be 48 V or higher and/or the stepped-down voltage may be 24 V or lower.

The LV battery subsystem may include a buffer capacitor that is interconnected between the supply node and ground.

The LV battery subsystem may include a diode having a cathode connected to the supply node and an anode connected to the LV battery.

The LV battery subsystem may include at least one low voltage load interconnected between the diode and the LV battery.

The HV battery subsystem may include at least one relay for disconnecting the battery cell stack and wherein a relay monitoring circuit is connected to the supply node.

An operation voltage of the LV battery subsystem may have a lower boundary voltage between 6 V and 8 V and an upper boundary voltage between 12 V and 24 V.

The voltage threshold may be at least 0.5 V below the lower boundary voltage.

The DC/DC converter may include a galvanically isolated DC/DC converter, a flyback converter, a forward converter, or a push-pull converter.

Embodiments are also directed to a vehicle including a battery system according to an embodiment, wherein at least one HV load is supplied by the HV battery subsystem and at least one LV load is supplied by the LV battery subsystem.

The at least one HV load may include an electric motor and the at least one LV load may include a safety-relevant vehicle control unit.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

As used herein, the term "and/or" includes any and all combinations of one or more of the associated listed items. It will be understood that if the terms "first" and "second" are used to describe elements, these elements are limited by these terms. These terms are only used to distinguish one element from another element. For example, a first element may be named a second element and, similarly, a second element may be named a first element. Expressions such as "at least one of," when preceding a list of elements, modify the entire list of elements and do not modify the individual elements thereof.

As used herein, the term "substantially," "about," and similar terms are used as terms of approximation and not as terms of degree, and are intended to account for deviations in measured or calculated values that would be recognized by those of skill in the art. If the term "substantially" is used in combination with a feature that could be expressed using a numeric value, the term denotes a range of +/−5% of the value centered on the value.

According to an example embodiment, a battery system for an electric vehicle includes a high voltage (HV) battery subsystem having a battery cell stack with battery cells electrically connected between stack nodes. The battery cells may be connected in series and/or in parallel between a first and a second stack node, e.g., in a XsYp configuration. The HV battery subsystem further includes a HV battery net configured for connecting HV loads to the battery cell stack, e.g., an electric motor of the vehicle, which may be an electric or hybrid vehicle. Herein, references to an electric vehicle encompass a hybrid vehicle.

The battery system of the present example embodiment further includes a low voltage (LV) battery sub system having a LV battery, e.g., a 12 V lead acid battery. The LV battery may be any other kind of battery, while an operational voltage usually supplied by the LV battery is lower than an operational voltage usually supplied by the HV battery stack. The LV battery subsystem further includes a supply node that is connected to the LV battery. Thus, the supply node is power supplied by the LV battery. The LV battery may include a first LV terminal and a second LV terminal, and the supply node is connected to one of the first LV terminal and the second LV terminal. The supply node may be configured to power supply at least one security-relevant load. Thus, the power supply to the supply node may be considered a security-relevant feature, e.g., with respect to ASIL B/C.

The battery system of the present example embodiment further includes a DC/DC converter having a primary coil that is disposed in the HV battery system and further having a secondary coil that is disposed in the LV battery system. The DC/DC converter may include additional elements, e.g., analog circuit elements or control units. The voltage conversion in the DC/DC may include the wireless energy transfer from the primary coil to the secondary coil, such that no energy bypasses the wireless energy transfer.

According to the present example embodiment, the primary coil is connected to one of the stack nodes via a switch, and thus may be selectively connected to one of the stack nodes via the switch. The stack nodes may be connected to each other via the primary coil, when the switch is set conductive. The stack nodes may not be connected to each other or short-circuited to each other, when the switch is set non-conductive. Further, the stack nodes may not be connected to each other via the stack nodes, when the switch is set non-conductive. The switch may at the same time control a power conversion via the DC/DC converter, e.g., by setting a duty cycle of the DC/DC converter, in a case the switch is set conductive. Setting the switch conductive may also include setting the switch conductive intermittently, while setting the switch non-conductive means setting the DC/DC inactive.

In the battery system of the present example embodiment, a threshold signal that is indicative of a voltage at the supply node is generated in the LV battery subsystem. The threshold signal may directly represent the voltage at the supply node, or may be associated to the voltage at the supply node in a predefined manner. The threshold signal may be an analog signal or a binary signal generated based on an analog signal.

The threshold signal is transmitted to the HV battery subsystem. In the HV battery subsystem, the threshold signal is received and the state of the switch, i.e., the conductivity state of the switch, is controlled based on the threshold signal. The state may be controlled directly by the threshold signal, e.g., the threshold signal may be a control signal for setting the conductivity of the switch. However, the threshold signal may also be received by a switch controller disposed in the HV battery subsystem, and configured to control the switch based on the threshold signal.

The battery system of the present example embodiment may provide a redundant power supply for the supply node, and thus any security-relevant load connected thereto. At the same time, the battery system of the present example embodiment may ensure that components of the HV battery subsystem that contribute to electromagnetic interference (EMI) (such as the DC/DC converter and the switch (switching noise)) are only operated when the redundant power supply to the supply node by the HV battery subsystem is called for. Thus, in the redundant power supply of the present example embodiment, additional electromagnetic shielding means or filter elements for avoiding EMI disturbances may be omitted, thus reducing the costs and space requirements of the system.

In an example embodiment of the battery system, the LV battery subsystem includes a comparator, wherein a comparator denotes any analog or integrated circuit or circuit component that is capable of comparing two voltages with each other and outputting a signal based on the result of the comparison. According to the present example embodiment, the comparator includes a first input node that is connected to the supply node and receives the voltage at the supply node. The comparator further includes a second input node that is connected to a predetermined reference voltage ($V_{REF}$), which may be generated, e.g., based on the supply voltage of the LV battery. Based on the input voltages, the comparator generates and outputs the threshold signal, e.g., via an output node of the comparator. However, the threshold signal transmitted to the HV battery subsystem may also be a voltage value applied to the supply node and a comparison to the reference voltage $V_{REF}$ may be also carried out in the HV battery subsystem.

The threshold signal is transmitted via an optocoupler from the LV battery subsystem to the HV battery subsystem. The optocoupler may include a light source that is disposed in the LV battery subsystem and that is configured to generate a light signal that is indicative of a voltage at the supply node. Therefore, the light source may receive the threshold signal generated by the comparator as described above. However, the light source may also receive the voltage applied to the supply node as a direct input. The optocoupler may further include a photo detector disposed in the HV battery subsystem and configured to detect a light signal incident thereon, and to generate an output signal based on the light signal. The signal output of the photo detector may be then used to control the switch in the HV battery subsystem, either directly or by starting the operation of a switch controller. The use of an optocoupler advantageously allows to transmit the threshold signal from the LV battery subsystem to an electrically isolated HV battery subsystem, thus further reducing EMI.

According to the present example embodiment, the switch may be set switching if the threshold signal is indicative of a voltage below the threshold voltage ($V_{TH}$). The threshold voltage may be identical to the reference voltage as described above. However, the threshold voltage may also differ from the reference voltage and/or the voltage comparison may be carried out in the HV battery subsystem. Further, the switch may be set non-conductive if the threshold signal is indicative of a voltage above the threshold voltage ($V_{TH}$). Thus, the switch is set non-conductive as long as a sufficient voltage above the threshold voltage is supplied to the supply node by the LV battery. In the present example embodiment, the switch may be a semiconductor switch, e.g., a transistor based switch, or an electromechanical switch, e.g., a relay switch. Setting the switch switching refers to setting the switch conductive, particularly with an intermittent conductivity of the switch, e.g., during a PWM operation of the switch under the control of a switch controller.

In the battery system according to the present example embodiment, a stack voltage supplied by the battery cell stack is provided to the primary coil if the switch is set switching. By applying the stack voltage to the primary coil, a current flows through the primary coil and generates a magnetic field. By the variations in the magnetic field, a current is induced in the secondary coil and therefore a stepped-down voltage is provided to the supply node by the secondary coil. The stepped-down voltage is lower than the stack voltage, which is ensured by setting a suitable ratio of the dimension and/or winding count of primary and secondary coil.

If the voltage supplied to the supply node by the LV battery drops below $V_{REF}$, the switch is set switching and the supply node is redundantly power supplied by the battery cell stack. In an example embodiment, the stack voltage is 48V, 60V, or higher, and the supply voltage of the LV battery is about 12V to 24V. Due to normal variations, the supply voltage of the LV battery may vary between a lower bound of about 6V to 8V and an upper bound of about 12V to 24V. Thus, the threshold voltage, $V_{TH}$, and/or the reference voltage, VREF, may be lower than the nominal supply voltage of the LV battery in order to reliably limit the operation of the DC/DC converter to situations where sufficient supply of the supply node cannot be ensured.

The LV battery subsystem includes a buffer capacitor that is interconnected between the supply node and ground. The supply node is interconnected between the buffer capacitor and the LV battery. Thus, the LV battery charges the buffer capacitor and the voltage at the supply node is stabilized by the buffer capacitor. When the supply by the LV battery is ceased abruptly, the use of the buffer capacitor advantageously allows for a supply of the supply node until the DC/DC converter starts its operation for providing the stepped-down voltage. Thus, always-on operation of the DC/DC converter may be avoided while ensuring sufficient voltage supply to the supply node. Further, the buffer capacitor limits the voltage applied to the supply node when supplied with the stepped-down voltage by the DC/DC converter, and filters out noisy AC components.

In another example embodiment, the LV battery subsystem further includes a diode that is interconnected between the LV battery and the supply node, wherein a cathode of the diode is connected to the supply node and an anode of the diode is connected to the LV battery. In the context of the present example embodiment, a diode refers to any component or circuitry interconnected between the LV battery and the supply node that allows an electric current to flow from the LV battery to the supply node but prevents an electric current to flow from the supply node towards the LV battery. Thus, an overcharging or malfunction of the LV battery may be avoided by applying the stepped-down voltage to the LV battery in a state where the LV battery cannot longer power supply the supply node with at least the threshold voltage.

The LV battery subsystem includes at least one low voltage load that is interconnected between the diode and the LV battery. The at least one LV load may be a load other than a security-relevant load for the operation of the battery system and/or the vehicle. With this setup, power supply of the LV load by the stepped-down voltage and hence power drain from the preferably security-relevant supply node may be avoided.

The HV battery system includes at least one relay for disconnecting the battery cell stack, e.g., from a downstream load, a vehicle chassis and/or control electronics. According to the present example embodiment, a relay monitoring circuit may be connected to the supply node. The electronic control units of the battery system and/or the vehicle, e.g., a battery management system (BMS) is operated by the LV battery. Thus, if the LV battery supply is unintentionally lost, a relay that galvanically disconnects the battery cell stack from a HV board net may open, while the BMS cannot determine the current through the relay at the time when the relay contact is opened. Thus, a physical damage to the relay contact would remain unknown, rendering reactivation, i.e., closing, the relay, unsafe. However, by power supplying the relay monitoring circuit via the supply node in a redundant manner by the LV and HV battery subsystem, wherein the relay monitoring circuit is configured to determine a current through the relay (contact), such an unsafe state of the relay contact may be reliably avoided and hence relay reactivation may be safely performed. In an example embodiment, a relay monitoring and control circuit is connected to the supply node, wherein such circuit is further configured to control the conductivity state of the relay.

An operation voltage of the LV battery subsystem may have a lower boundary voltage between 6V and 8V and an upper boundary voltage between 12V and 24V. The voltage threshold $V_{TH}$ is at least 0.5V below the lower boundary voltage of the operation voltage of the LV battery system.

Thus, the operation of the DC/DC converter is reliably restricted to cases of insufficient power supply by the LV battery and excess EMI is avoided.

The DC/DC converter may be a galvanically isolated DC/DC converter and may be one of a flyback converter, a forward converter, or a push-pull converter. However, other galvanically isolated DC/DC converters may be used.

Another example embodiment relates to a vehicle, e.g., an electric or hybrid vehicle, that includes a battery system according to an embodiment, wherein at least one HV load is supplied by the HV battery system and at least one LV load is supplied by the LV battery system. The at least one HV load includes an electric motor and the at least one LV load includes a security-relevant battery system and/or vehicle control unit which is power supplied by the supply node of the LV battery subsystem. Other LV loads may be supplied by the LV battery directly.

Figure 1:
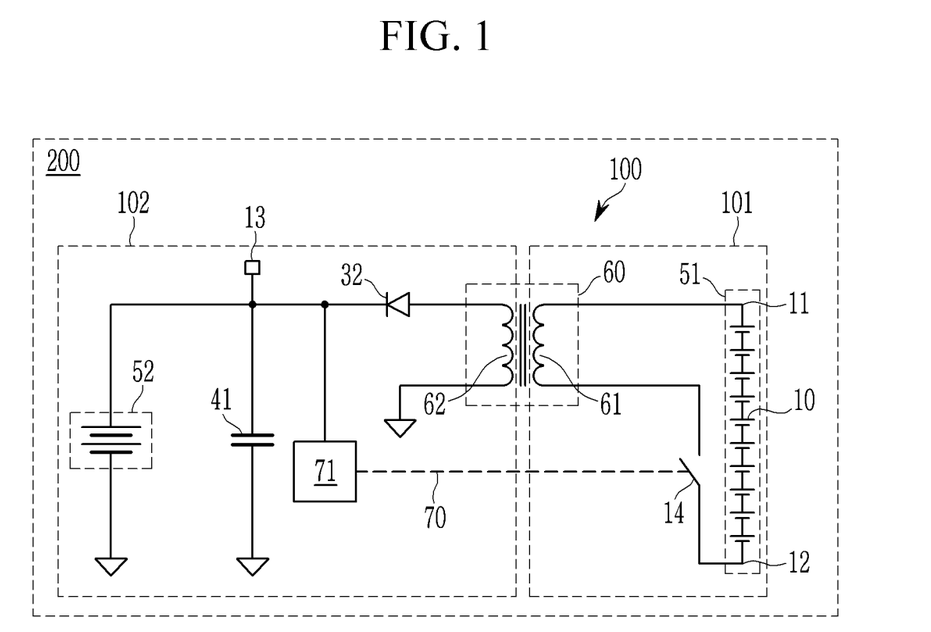
FIG. 1 schematically illustrates a battery system 100 according to a first example embodiment.

FIG. 1 schematically illustrates a battery system 100 according to a first example embodiment.

According to the present example embodiment, the battery system 100 is located in an electric vehicle 200 and is configured to power supply the electric vehicle 200. The battery system 100 includes a HV battery subsystem 101 that includes a battery cell stack 51 with battery cells 10 interconnected between a first stack node 11 and a second stack node 12. The battery cell stack 51 is configured to supply a high voltage of at least 48V, 60V, or even higher, that may be used to propel an electric motor of the electric or hybrid vehicle 200. The battery system 100 further includes a LV battery subsystem 102 with a LV battery 52, e.g., a 12V lead acid battery. The LV battery 52 is configured to a supply a LV board net of the electric vehicle 200 including a plurality of LV loads, among them security-relevant LV loads.

The LV battery subsystem 102 further includes a supply node 13 that is connected to the LV battery 52 and is powered by the LV battery 52. A buffer capacitor 41 is interconnected between the supply node 13 and ground, wherein the supply node 13 is interconnected between the buffer capacitor 41 and the LV battery 52. The buffer capacitor 41 thus limits the voltage applied to the supply node 13 by the LV battery 52. At least one security-relevant LV node (not shown) is connected to the supply node 13.

The HV battery subsystem 101 and the LV battery subsystem 102 are connected to each other via a DC/DC converter 60 in a galvanically isolated manner. The DC/DC converter 60 includes a primary coil 61 disposed in the HV battery subsystem 101 and a secondary coil 62 disposed in the LV battery subsystem 102. The ratio of the windings of the primary coil 61 and of the secondary coil 62 is such that the DC/DC converter 60 functions as a step-down converter from the HV battery subsystem 101 to the LV battery subsystem 102.

The primary coil 61 is connected to the battery cell stack 51 via a switch 14, which is either an electromechanical switch, e.g., a relay, or a semiconductor switch, e.g., a transistor. If the switch 14 is set conductive, the first and second stack nodes 11, 12 are connected to each other via the primary coil 61. If the switch 14 is set non-conductive, the first and second stack nodes 11, 12 are either disconnected or shorted to each other via a HV board net including HV loads (not shown), i.e., the stack nodes are not connected to each other via the primary coil 61. The LV battery subsystem 102 includes a second diode 32 that is interconnected between the supply node 13 and the secondary coil 62, wherein a cathode of the second diode 32 is connected to the supply node 13 and an anode of the second diode 32 is connected to the secondary coil 62.

In the example embodiment of FIG. 1, the switch 14 is controlled by a switch controller 71 that is located in the LV battery system 102. The switch controller 71 is connected to the supply node 13 and receives a voltage applied to the supply node 13 as an input signal. Based on the received supply node voltage, the switch controller 71 transmits a threshold signal 70 that is indicative of the voltage at the supply node 13 to the HV battery subsystem 101. Based on the threshold signal 70, the switch 14 in the HV battery subsystem 101 is operated, i.e., set either switching or non-conductive. The switch 14 is set switching, if the voltage at the supply node 13 is less than a predetermined threshold voltage ($V_{REF}$) that is insufficient to reliably power supply the at least one security-relevant LV load (not shown).

In the example embodiment of FIG. 1, the switch controller 71 solely controls a general state of the switch 14 to be either switching or non-conductive. The operation state of the switch 14 being switching does not refer to that the switch 14 is continuously set conductive. The HV battery subsystem 101 may include another switch controller (not shown) that controls the switching state, e.g., a duty ratio of the switch 14, during a switching state of the switch 14 set by the switch controller 71 in the LV battery subsystem 102. Thus, even in the switching state determined by switch controller 71 (i.e., threshold signal 70), a switch controller of the HV battery subsystem 101 may set the switch 14 to be non-conductive in an intermittent manner. By such controls, the switch 14 may be supply the stack voltage of battery cell stack 51 to the primary coil 61 for generating a stepped down voltage in the secondary coil 62 which is then supplied to the supply node 13 as shown in FIG. 1. Thus, a redundant power supply to supply node 13 is ensured while excess EMI is reduced.

Figure 2:
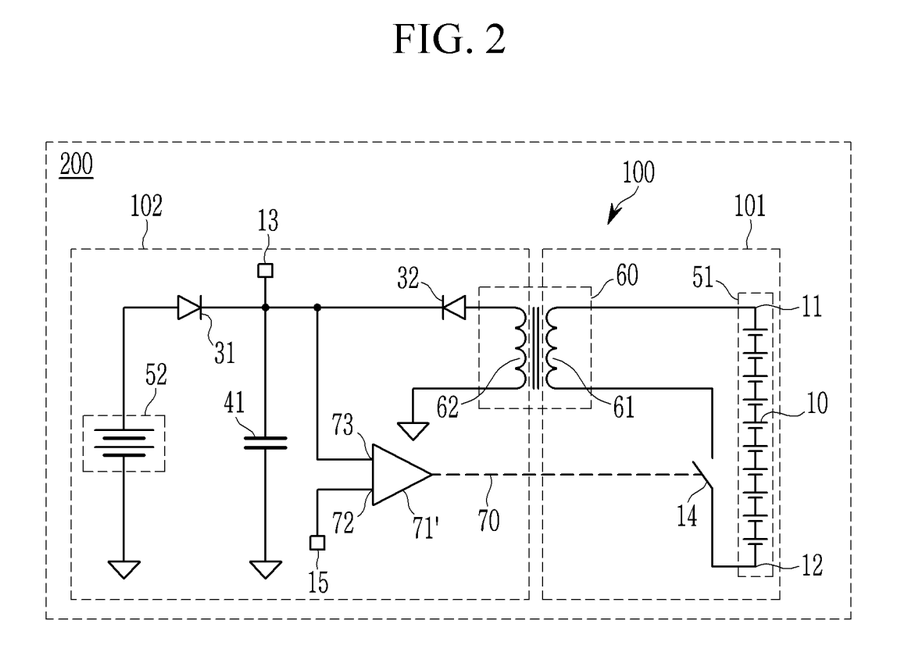
FIG. 2 schematically illustrates a battery system 100 according to a second example embodiment.

FIG. 2 schematically illustrates a battery system 100 according to a second example embodiment. In FIG. 2 identical reference signs to those of in FIG. 1 refer to identical components as in FIG. 1 and a repeated description thereof is hence omitted.

In the battery system 100 of FIG. 2, the LV battery subsystem 102 further includes a diode 31 that is interconnected between the LV battery 52 and the supply node 13 so as to suppress a current flowing from the supply node 13 to the LV battery 52. Thus, the stepped-down voltage supplied by the secondary coil 62 is not supplied to the LV battery 52. Further, non-security-relevant LV loads (not shown) may be interconnected between the diode 31 and the LV battery 52 such that the stepped-down voltage is also not supplied to the non-security-relevant LV loads. Thus, voltage drainage by the LV battery 52 or those non-security-relevant LV loads may be avoided in order to ensure reliable supply of the supply node 13.

Further, the LV battery subsystem 102 includes a comparator 71' with a first input node 72 that is connected to the supply node 13 and a second input node 73 that is connected to a reference voltage node 15. The first input node 72 receives the voltage applied to the supply node 13 and the second input node 73 receives a reference voltage (VREF) from a reference voltage node 15. The comparator 71' compares these two input voltages and outputs the threshold signal 70 based on the comparison. In the example embodiment of FIG. 2, the threshold signal takes a high value (e.g., "1" or "VDD"), if the voltage at supply node 13 exceeds the reference voltage and takes a low value (e.g., "0" or "VSS"), if the voltage at supply node 13 falls below the reference voltage supplied from reference voltage node 15. However, other implementations of the comparator 71' are possible.

The threshold signal 70 is transmitted by the comparator 71' to the galvanically isolated HV battery subsystem 101, e.g., to a switch controller (not shown) in the HV battery subsystem 101. The switch controller (not shown) in the HV battery subsystem 101 does not perform an operation of the normally off, i.e., non-conductive, switch 14 in response to a high threshold signal 70 and performs a control operation for the switch 14 in response to a low threshold signal 70. The switch controller in the HV battery subsystem 101 may be a PWM controller for the switch 14.

Figure 3:
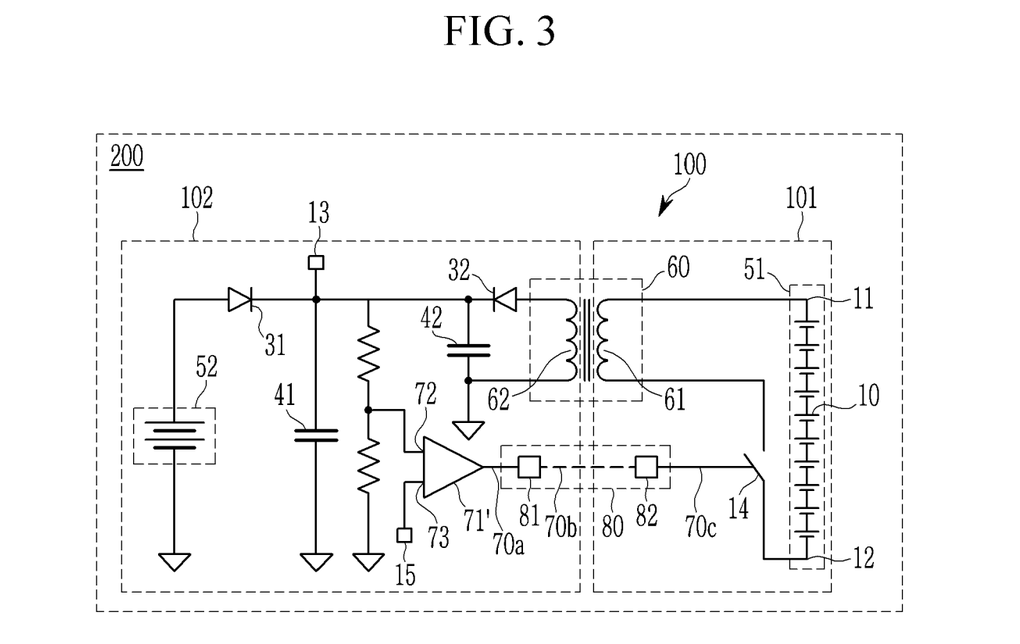
FIG. 3 schematically illustrates a battery system 100 according to a third example embodiment.

FIG. 3 schematically illustrates a battery system 100 according to a third example embodiment. In FIG. 3 identical reference signs to those of FIGS. 1 and 2 refer to identical components as in FIGS. 1 and 2 and a repeated description thereof is omitted.

In the battery system 100 of FIG. 3, the DC/DC converter 60 is setup as a flyback converter, and the LV battery subsystem 102 further includes a second capacitor 42 that is charged by the secondary coil 62 and is interconnected between the cathode of the second diode 32 and a ground potential. Thus, a filtered DC component of the stepped-down voltage is reliably supplied to the supply node 13 by the secondary coil 62.

Further, in the battery system of FIG. 3, the comparator 71' is connected to the supply node 13 via a voltage divider for limiting the voltage input to the first input node 72 for improving the comparison with the reference voltage VREF. The battery system 100 of FIG. 3 further includes an optocoupler 80 with laser diode 81 in the LV battery subsystem 102 and a combined photocell and switch controller 82 in the HV battery subsystem 101.

The output of the comparator 71' is a first wire-based threshold signal 70a of the threshold signal that is generated by the comparator 71' based on the voltage comparison as described above. The first wire-based threshold signal 70a is supplied to the laser diode 81 that is configured to generate a light signal based on the first wire-based threshold signal 70a, e.g., to generate a light signal in response to a high threshold signal 70a and to not generate a light signal in response to a low threshold signal 70a. However, also light signals of different intensities may be generated in response to a low or high first threshold signals 70a.

The generated light signal is transmitted as a wireless component 70b of the threshold signal 70 to the galvanically isolated HV battery subsystem 101, where it is received at the photo cell (photo diode) of the switch controller 82. Based on whether or not the wireless component 70b (light signal) is received, or based on the intensity of the received light signal, the switch controller 82 outputs a second wire-based threshold signal 70c to the switch 14. The second wire-based threshold signal 70c may only be transmitted in response to receiving a low threshold signal 70b or may be transmitted with different values based on the received wireless signal 70b. Further, the second wire-based threshold signal 70c may be further modulated in order to serve as a PWM control signal for the switch 14 in case of a low threshold signal 70a, 70b. This setup allows a reduction in electromagnetic interference in the battery system 100.

The electronic or electric devices and/or any other relevant devices or components according to embodiments of the embodiments described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g., on a PCB or another kind of circuit carrier. The conducting elements may include metallization, e.g., surface metallizations and/or pins, and/or may include conductive polymers or ceramics. Further, electrical energy might be transmitted via wireless connections, e.g., using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

By way of summation and review, for supplying an electric motor of a vehicle, a high voltage, e.g., above 48 V, may be supplied by a battery system, and the battery system may be connected to a high voltage (HV) board net for supplying the electric motor. However, the control units of the battery system and/or of the vehicle may operate at lower voltages. A vehicle thus may use an additional low voltage (LV) supply, e.g., a 12 V lead acid battery, which is connected to a LV board net. In such system, the security-relevant components of the vehicle as well as of the HV battery system may be supplied by the LV battery in order to provide reliable function of these components even in a fault state of the HV board net.

In order to avoid excessive draining of the LV battery in such system or the loss of the security-relevant components, a redundant power supply may be provided for supplying the LV board net from the HV battery system via a DC/DC converter when required. However, such redundant power supply systems should be galvanic isolated from the LV board net, but a galvanically isolated DC/DC converter may cause electromagnetic interference. Countermeasures such as filters or shielding means may be used, but such components may increase the costs and the construction space requirements of the electric vehicle.

As described above, embodiments may provide a battery system with an integrated low voltage power supply, which allows reducing the costs and construction space requirements of an electric vehicle.

As described above, embodiments relate to a battery system with an integrated redundant power supply for a low voltage board net, and to a battery system for an electric vehicle with an EMC optimized redundant power supply, as well as to a vehicle with such a battery system.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

REFERENCE SIGNS 10 battery cell
11 first stack node
12 second stack node
13 supply node
14 switch
15 reference voltage node
31 first diode
32 second diode
41 buffer capacitor
42 second capacitor
51 battery cell stack
52 LV battery
60 DC/DC converter
61 primary coil
62 secondary coil
70 threshold signal
70a first wire-based threshold signal
70b wireless threshold signal
70c second wire-based threshold signal
71 switch controller
71' comparator
72 first input node
73 second input node
80 optocoupler
81 laser diode
82 photocell/switch controller
100 battery system
101 HV battery subsystem
102 LV battery subsystem
200 electric vehicle

What is claimed is:

1. A battery system for an electric vehicle, comprising:
a high voltage (HV) battery subsystem including a battery cell stack with battery cells electrically connected between stack nodes;
a low voltage (LV) battery subsystem including a LV battery and a supply node connected to the LV battery;
a DC/DC converter with a primary coil in the HV battery subsystem and a secondary coil in the LV battery subsystem, wherein the primary coil is connected to one of the stack nodes via a switch,
wherein a threshold signal indicative of a voltage at the supply node is generated in the LV battery subsystem and is transmitted to the HV battery system, and
wherein a state of the switch is controlled based on the threshold signal,
wherein the LV battery subsystem comprises a comparator with a first input node connected to the supply node and a second input node connected to a predetermined reference voltage,
wherein the threshold siganl is output by the comparator, and
wherein the HV battery substeym and the LV battery subsystem are connected to each other via the DC/DC converter in a galvanically isolated manner.

2. The battery system as claimed in claim 1, wherein the threshold signal is transmitted via an optocoupler from the LV battery subsystem to the HV battery subsystem.

3. The battery system as claimed in claim 1, wherein the switch is set switching if the threshold signal is indicative of a voltage below a threshold voltage, and wherein the switch is set non-conductive if the threshold signal is indicative of a voltage above the threshold voltage.

4. The battery system as claimed in claim 1, wherein, when the switch is set switching, a stack voltage is provided to the primary coil, and a stepped-down voltage is provided to the supply node by the secondary coil.

5. The battery system as claimed in claim 4, wherein the stack voltage is 48 V or higher and/or wherein the stepped-down voltage is 24 V or lower.

6. The battery system as claimed in claim 1, wherein the LV battery subsystem includes a buffer capacitor that is interconnected between the supply node and ground.

7. The battery system as claimed in claim 1, wherein the LV battery subsystem includes a diode having a cathode connected to the supply node and an anode connected to the LV battery.

8. The battery system as claimed in claim 7, wherein the LV battery subsystem includes at least one low voltage load interconnected between the diode and the LV battery.

9. The battery system as claimed in claim 1, wherein the HV battery subsystem includes at least one relay for disconnecting the battery cell stack and wherein a relay monitoring circuit is connected to the supply node.

10. The battery system as claimed in claim 3, wherein an operation voltage of the LV battery subsystem has a lower boundary voltage between 6 V and 8 V and an upper boundary voltage between 12 V and 24 V.

11. The battery system as claimed in claim 10, wherein the voltage threshold is at least 0.5 V below the lower boundary voltage.

12. The battery system as claimed in claim 1, wherein the DC/DC converter includes a galvanically isolated DC/DC converter, a flyback converter, a forward converter, or a push-pull converter.

13. A vehicle comprising the battery system as claimed in claim 1, wherein at least one HV load is supplied by the HV battery subsystem and at least one LV load is supplied by the LV battery subsystem.

14. The vehicle as claimed in claim 13, wherein the at least one HV load includes an electric motor and wherein the at least one LV load includes a safety-relevant vehicle control unit.

* * * * *